Jan. 30, 1962 L. J. BRANCATO 3,018,684
WIRE COIL THREAD CONNECTION IN SOFT MATERIALS
Filed Dec. 27, 1955
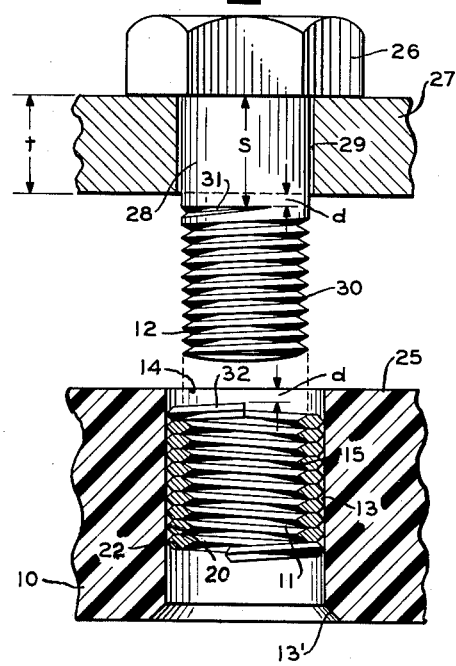
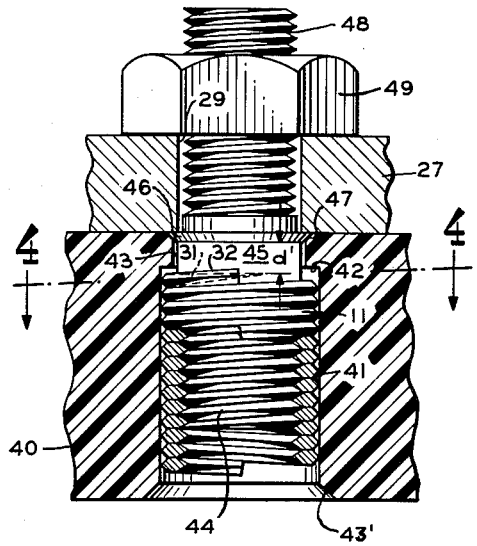
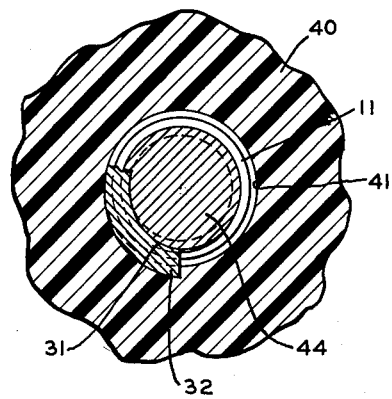
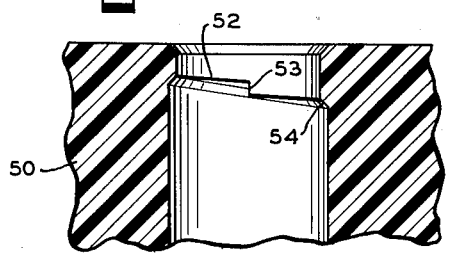
INVENTOR.
LEO J. BRANCATO
BY *Walter S. Henton*
ATTORNEY United States Patent Office 3,018,684
Patented Jan. 30, 1962

3,018,684
WIRE COIL THREAD CONNECTION IN
SOFT MATERIALS
Leo J. Brancato, Danbury, Conn., assignor to Heli-Coil
Corporation, Danbury, Conn., a corporation of Delaware
Filed Dec. 27, 1955, Ser. No. 555,586
1 Claim. (Cl. 85—1)

The invention relates to a thread connection in soft material. In order to provide a female screw thread in a boss or other part of soft material, wire coil inserts are frequently used, the inner portions of which form the female thread. The thread may have any desired form, for instance, in the case of an American Standard thread, the inner contour of the cross section of the wire will form a 60 degrees V. It is also conventional to use the outer wire portions as a male screw thread so that the wire coil can engage the thread of a tapped hole.

Frequently, however, the tapping of the thread in the hole of an element such as a boss of soft material, is found to be a cumbersome and relatively expensive operation, which even may be unnecessary for a safe connection of the coil to the boss, due to the smallness of the forces to which the thread is subjected in the axial direction. In order to avoid this drawback, it has been proposed to provide an element of a soft material with a smooth walled cylindrical bore and push into it an insert coil of slightly larger diameter than the hole, for which purpose the insert has been contracted prior to the insertion so as to bear against the wall of the hole owing to its resiliency. However, it will be obvious that such a connection between the insert and the boss element is not very firm wherefore, in many instances, seating tools have been used to widen the inserted coil throughout its length so that it bites with an outer edge of the coiled wire into the wall of the hole. Also staking tools have been employed to urge the rim at the end or ends of the hole down on the insert, leaving, of course, the inner wire portion free for the engagement of a male screw thread member. The seating and or staking are additional operations increasing the labor and cost of the application of the inserts to the hole.

Therefore, it is the purpose of the invention to provide in a soft material a screw connection which requires a minimum of operation, is inexpensive and still furnishes a connection between boss and insert of a strength which is sufficient in many instances.

According to the invention, a wire coil forming a female screw thread and having an outer edge will be inserted in a smooth walled cylindrical hole of a boss element so as to bear springingly against the cylinder wall. The male member to be used in the connection has a gradual runout of the last thread towards that member end which is trailing when the member is screwed into the insert. The dimensions of the bolt and the location of the insert in the hole are so selected that when the male element is tightened in the screw connection, the adjacent coil end engages the run-out of the thread groove of the male member and thereby will be forced with the outer wire edge into the soft material so as to be fixed in its position.

It is a further object of the invention to increase the firmness of the location of the insert in the hole by providing a shoulder forming an inner flange of the hole on which the insert end bears while engaging the run-out of the thread groove on the male member. In this instance, the shoulder adds to the load carrying ability of the threaded connection, while the offsetting of the top coil of the insert still is needed to prevent rotation of the insert when the screw is tightened.

Further objects and details of the invention will be apparent from the description given hereinafter and the accompanying drawing illustrating embodiments thereof by way of example.

In the drawing:

FIG. 1 is a side elevation, partly in section of the parts of a screw connection according to the invention prior to the engagement of the male screw thread member.

FIG. 2 is a cross-section of the wire of the insert coil of FIG. 1 on a larger scale, FIG. 3 is a view similar to FIG. 1 of a modification with the parts, however, in a connected position, FIG. 4 is a cross-section along line 4—4 of FIG. 3, and FIG. 5 is a partial section of a modified boss member.

Referring now to FIGS. 1 and 2 of the drawing, the parts of the connection consist of the boss element 10 of a soft material such as a plastic or metal casting, the wire coil insert 11, and the male member 12 shown as a headed screw; but it will be apparent that rather than a screw, a stud may be used. The boss element is provided with a smooth walled bore 13 which, for the sake of an easier assembly, may be provided with a flare 13', preferably opposite the entrance end 14 where the screw may be screwed in. However, it will be understood that in some instances the flare 13' may be provided at the entrance end and that this will be the case in the event the hole 13 is a blind hole rather than through-going.

The wire coil insert forms, with the inner portion 15 of the wire, the conventional female thread. The wire is of constant cross section from the one to the other end of the coil. The cross-section shown on a larger scale in FIG. 2, is destined for a screw according to the American National Standard, the angle between the inner flanks 16 and 17 being 60 degrees with a blunt crest at 18. The outer wire portions 19 form a sharp edge 20. The angle between the flanks 21 of the portion 19 may be selected depending upon the physical characteristic of the boss material and may preferably not be smaller than 60 degrees and not larger than 120 degrees. It is of importance that between the portions 15 and 19, the wire forms straight lands 22 so that when an axial load is applied to the assembled insert, the convolutions of the wire will not slip over one another or become misaligned. The coil 11 is originally wound with an outer diameter larger than that of the hole 13. In order to position the insert, it will be contracted and pushed into the hole from the end which, for this purpose, may be provided with the flare 13'. The coil will then tend to expand according to the preceding contraction and, consequently, bear firmly with its sharp wire edge 20 against the wall of the hole 13. The coil is pushed in so far that it is spaced a desired distance $d$ from the surface 25 of the boss element 10 into which the male screw member 12 is to be inserted. In FIG. 1, the member 12 is a screw having a head 26 bearing on a part 27 which, e.g., may be a cover for member 10. The member 12 projects with its shank 28 through a hole 29 in the part 27 underneath of which it is provided with the exterior screw thread 30. The thread groove of the thread 30 has a gradual run-out 31 toward head 26. This run-out is relatively short but extends at least 90 degrees but less than 360 degrees about the shank and is so far distant in the axial direction from the head 26 that the distance $s$ equals the thickness $t$ of the part 27 plus the aforementioned distance $d$. In consequence, when the screw is screwed down into the insert 11, the coil end 32 will be engaged by the run-out 31 so as to be urged radially outward and to bite into the material of the member 10. Thereby the coil will be safely anchored in member 10 and will be capable of withstanding a certain axial force exerted by the screw 12.

The manner in which the coil end is urged into the boss material is clearly shown in FIG. 4, which is a cross-section of a modification illustrated in FIG. 3. In this modified connection, the parts are shown in their engaged positions. The boss member 40 is provided with a smooth cylindrical hole 41 which, in its upper part 43, forms a shoulder or inner flange 42. Where the shoulder 42 is provided, the flaring has to be at the opposite end of the hole as shown at 43'. From the side of this flare, the coil 11 will be inserted until it bears with its upper end 32 on the shoulder 42. The width of this shoulder is according to that of the portion 19 (FIG. 2) plus the land-provided portion intermediate the portions 15 and 19. In the embodiment of FIG. 3, the male screw member 44 is a stud provided with a thread having a run-out 31 similar to that shown in FIG. 1. Above the thread on the male member, the shank 45 of the latter is provided with a bevelled collar 46. This collar is not necessarily provided but may serve the purpose of insuring that the stud when screwed in extends a predetermined length upwards from the top surface of the member 40. It is so formed as to engage into the bevelled upper opening 47 of the member 40. Stud 44 projects through a bore 29 of a member 27 of a type as described and is provided with a second thread 48 for the application of a nut 49. It will now be clear that, after the insertion of the insert so as to bear on the shoulder 42, stud 44 can be screwed in from the side of the narrower portion 43 of the hole 41. The distance d' of the run-out 31 of the thread groove is such that when the collar 46 is seated on the bevelled portion 47, the coil end 32 engages the run-out 31 whereby the end 32 will be urged into the material of the boss member 40. It will be understood that a shoulder, such as the shoulder 42, may or may not be provided in the hole 41 of FIG. 3 or in the hole 13 of FIG. 1 regardless whether the male member is a stud or a headed screw bolt.

FIG. 5 illustrates another modification showing a portion of the boss member denoted by 50. The member 50 differs from the member 40 merely in that the shoulder 52 has a helical surface with a step 53 and an inclined rim 54 according to the slant of the side 21 of the wire cross section in FIG. 2. In all other respects the boss 50 is similar to the boss 40 and the members 44 and 11 can be used in connection with the boss 50. With respect to the modification of FIG. 5, it is to be noted that an alignment of the end of the insert with the helical shoulder is not required during the assembling. The insert will turn itself under the turning influence of the screw until the end of the insert abuts against the end of the helical shoulder.

The device described hereinbefore and illustrated in the drawing furnishes a useful, simple and inexpensive screw connection in a boss of a soft material, which connection is sufficiently strong to withstand at least slight axial forces.

It will be apparent to those skilled in the art that many alterations and modifications of the structure shown can be made without departure from the essence and spirit of the invention which for this reason shall not be limited but by the scope of the appended claim.

I claim:

A screw thread connection comprising a boss or nut element of a relatively soft material, a relatively hard metal wire coil screw thread insert, and a male screw-thread provided member, said boss being provided with a throughgoing smooth walled cylindrical hole having a first entrance end for said male member and a second entrance end for said insert at the end opposite said entrance for said male member, said male member being a stud having a flange-like collar to bear on said boss on the side of said first entrance end, said insert being from end to end of constant cross-section having an inner screw thread forming portion of standard shape, an outer sharp edged portion and straight lands between said portions, the convolutions of said insert bearing with their lands upon one another, the thread groove of said male member having a gradual relatively short run-out extending around at least a quarter of the circumference of said member but less than 360 degrees, the angle between the thread groove flanks in the run-out being the same as in the remainder of said thread groove of said male member, the hole of said boss being provided with an inner shoulder for engagement by the insert end adjacent said hole entrance and abutment means effective between said male member and said boss so as to limit the depth to which said member can enter said insert when the latter engages said shoulder, thereby to ensure registering of said run-out and said insert end.

References Cited in the file of this patent

UNITED STATES PATENTS

| | | |
|---|---|---|
| 806,406 | Farrington | Dec. 5, 1905 |
| 1,966,520 | Rayner | July 17, 1934 |
| 2,022,946 | Staempli | Dec. 3, 1935 |
| 2,346,051 | Seamark | Apr. 4, 1944 |
| 2,390,514 | Cram | Dec. 11, 1945 |
| 2,497,081 | Hattan | Feb. 14, 1950 |
| 2,581,399 | Forster | Jan. 8, 1952 |